(No Model.)
O. B. SHARP & I. J. REED.
FENCE WIRE LAYING MACHINE.
No. 395,359. Patented Jan. 1, 1889.
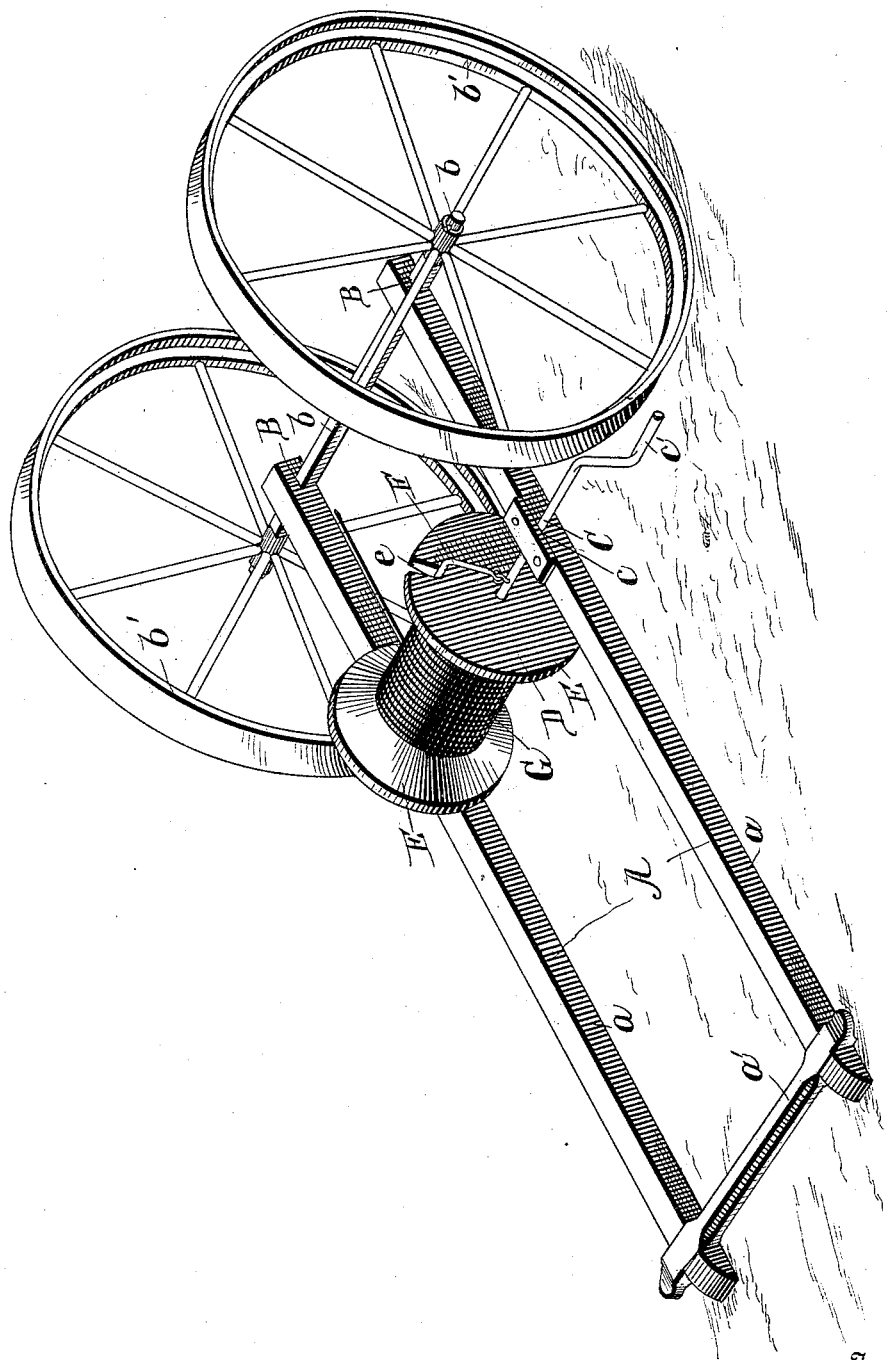
Witnesses
Henry G. Dieterich
R. J. Marshall
Inventors
Orvis B. Sharp and
Ira J. Reed
By their Attorneys

UNITED STATES PATENT OFFICE.

ORVIS BURT SHARP AND IRA JAMES REED, OF MARENGO, IOWA.

FENCE-WIRE-LAYING MACHINE.

SPECIFICATION forming part of Letters Patent No. 395,359, dated January 1, 1889.

Application filed September 20, 1888. Serial No. 285,927. (No model.)

*To all whom it may concern:*

Be it known that we, ORVIS BURT SHARP and IRA JAMES REED, citizens of the United States, residing at Marengo, in the county of Iowa and State of Iowa, have invented new and useful Improvements in Fence-Wire-Laying Machines, of which the following is a specification.

The invention relates to improvements in fence-wire-laying machines; and it consists in the construction and novel combination of parts hereinafter described, illustrated in the drawing, and pointed out in the appended claim.

The figure constituting the drawing is a perspective view of a machine embodying the invention.

Referring to the drawing by letter, A designates the frame of the machine composed of the side bars, $a$, and cross-bar $a'$, which frame serves as a handle to draw the machine forward. The side bars, $a$, are provided in their lower surfaces near their rear ends with bearing-notches B, that may be fitted upon the axle $b$ of any pair of wheels $b'$ $b'$—such as those of a corn-plow.

C is a shaft having bearings $c$ secured at opposite points to the upper surfaces of the side bars and provided at one end with a crank-handle, $c'$, as shown.

D is a spool turning loosely on the shaft C, and provided with the circumferential end flanges, E, one of which has a large notch, $e$, in its edge.

F is a detent pivoted to a staple or eye secured to the shaft C adjacent to the notched circumferential flange. The said detent is hooked at its free end, and is adapted to be turned into the notch $e$ and hold therein, thus causing the spool to rotate with the shaft.

The wire G is wound on the spool. When laying or stringing wire upon a fence, the spool is allowed to turn loosely on the shaft, (the detent F being turned therefrom,) so that the wire will pay out as the machine advances.

In removing wire from a fence the spool is connected by the detent with the shaft, so that it will rotate therewith. Then as the machine moves along the fence the wire is wound on the spool by means of the crank-handle. The frame with the shaft and spool attached may be connected to any pair of wheels that are convenient and at hand or that can be quickly and easily detached from a machine.

The machine is simple of construction and durable and well adapted to serve its purpose.

The side bars, $a$, at their ends near the cross-bar $a'$ are rounded downward, in order to permit them to rest and hold against the ground when tightening wire from post to post, the spool or reel pulling the wire tight from one post to another. When winding up great lengths of wire, the said ends must be pulled forward by one man while a second man turns the spool.

Having described our invention, we claim—

The improved fence-wire-stringing machine, comprising the side bars, $a$, having notches in their under sides at one end adapted to engage an axle, the other ends of said bars being tapered and connected by a cross-bar, $a'$, the crank-shaft journaled in the side bars, the spool loosely mounted on the crank-shaft, and having annular flanges at its ends, one of said flanges having a radial notch in its edge, and the detent having one end pivoted in a staple on the crank-shaft, and having its end hooked and adapted to engage the notch in the flange of the spool, as specified.

In testimony that we claim the foregoing as our own we have hereto affixed our signatures in presence of two witnesses.

ORVIS BURT SHARP.
    IRA JAMES REED.

Witnesses:
 GEO. W. WILSON,
 J. T. MCGUIRE.